3,085,891
OXAZOLINES AS ANTISTRIPPING AGENTS IN ASPHALT PAVINGS
George N. Butter, Terre Haute, Ind., assignor to Commercial Solvents Corporation, New York, N.Y., a corporation of Maryland
No Drawing. Filed Sept. 17, 1959, Ser. No. 840,547
11 Claims. (Cl. 106—273)

My invention relates to asphalt compositions and, more particularly, it relates to asphalt compositions resistant to stripping from surfaces on which they are applied comprising essentially asphalt containing a substituted oxazoline having the following structural formula:

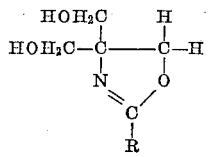

in which R is a member selected from the group consisting of long chain alkyl and alkenyl hydrocarbon radicals containing from no less than about 9 to up to and including 30 carbon atoms.

The asphalt compositions used in asphalt pavings are viscous semi-solid materials. In order to apply these materials to a surface it is necessary first to convert them to a temporarily fluid state such as an asphalt in water dispersion. For example, one method of dispersing asphalts is to prepare a water emulsion of the asphalt, and then apply the emulsion at an elevated temperature to the surface to be coated. The water evaporates, thus breaking the emulsion and leaving the asphalt deposited on the surface.

Asphalt compositions, even though having many advantages of ease of application and service for paving, roofing and other uses, have a tendency upon exposure to air and sun to become brittle, thus losing their initial desirable properties. Such brittle asphalt substances when exposed to water tend to strip away from the surface to which they are attached, or either rupture or break into chunks. Thus, the useful life of the asphalt composition is greatly shortened. Also, because of the tendency of asphalt not to bind with many available substrates, particularly siliceous surfaces, a coverage of adequate thickness is not obtained.

I have now discovered that highly satisfactory antistripping asphalt compositions which bind with siliceous surfaces to give a coverage of adequate thickness, resist rupturing and have the tendency not to become brittle over extended periods of time can be prepared by incorporating into asphalt compositions a substituted oxazoline having the following general formula:

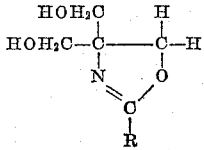

in which R is selected from the group consisting of long chain alkyl and alkenyl hydrocarbon radicals containing from no less than about 9 to up to and including 30 carbon atoms.

Examples of compounds having this general formula which are found to be useful for the above purposes include:

2-nonyl-4,4-bis(hydroxymethyl)-2-oxazoline,
2-hendecyl-4,4-bis(hydroxymethyl)-2-oxazoline,
2-heptadecenyl-4,4-bis(hydroxymethyl)-2-oxazoline,
2-heptadecyl-4,4-bis(hydroxymethyl)-2-oxazoline,
2-henicosyl-4,4-bis(hydroxymethyl)-2-oxazoline, etc.

In accordance with my invention, the above substituted oxazolines are incorporated into asphalt compositions in amounts ranging from about 0.02 to 5% by weight based on the weight of the asphalt. I prefer, however, to add from about 0.5 to about 1.5% by weight of the oxazoline. I can add the above oxazolines to asphalt compositions by any suitable means. I prefer, however, to add them in the form of solutions of the above-described oxazolines, said solutions containing from about 55 to about 75% by weight of oxazoline based on the weight of the solution. I prefer, however, solutions containing from about 60 to about 70% by weight of oxazoline.

I can use as solvents for the above-described oxazolines any solvent therefor which vaporizes at a temperature above 125° F. and below 200° F. and which is liquid at 75° F. and is substantially inert to the oxazolines, asphalt compositions and surfaces with which they may come in contact. Suitable solvents include the lower aliphatic alcohols, such as methanol, ethanol, n-butanol, tertiary butyl alcohol, etc., aromatic and long chain aliphatic hydrocarbons such as benzene, toluene, xylene, decane, dodecane, etc., and chloroalkanes such as chloroform, carbon tetrachloride, etc.

The asphalt compositions of my invention can best be prepared by thoroughly mixing from about 0.01 to about 3.5% by weight of the above-described substituted oxazolines based on the weight of the asphalt composition with a suitable solvent therefor at a temperature of from about 70 to 125° F. and adding the resulting solution to an aqueous asphalt emulsion at a temperature ranging from about 125 to about 200° F. I prefer from about 0.3 to about 1.0% by weight of oxazoline. Asphalt and water emulsions comprising from about 55 to about 65% by weight of asphalt based on the weight of the emulsion are operative in my invention. I prefer to use an asphalt and water emulsion comprising essentially about 63% by weight of asphalt based on the weight of the emulsion.

The ability of asphalt compositions containing the above-described oxazolines to resist separation from the surface to which they are applied can be tested by any suitable means. One such test consists of applying an aqueous asphalt emulsion containing a substituted oxazoline to a stone aggregate to form a coating on the aggregate, heating the coated aggregate to from about 85 to about 95° C., placing the heated aggregate in boiling water accompanied with vigorous agitation, removing the water, drying the coated aggregate and estimating the percentage of total aggregate area which has remained coated. The effectiveness of my asphalt additives can thus be demonstrated by comparing the amount of surface remaining covered after the test using the asphalt composition containing substituted oxazolines with the amount of surface remaining covered after the test using the asphalt composition containing no substituted oxazoline.

The following examples will serve to illustrate my invention. I do not intend to be limited to the components, temperatures, proportions, etc., but rather it is intended that all equivalents obvious to those skilled in the art be included within the scope of my invention.

*Example I*

6.5 grams of 2-heptadecyl-4,4-bis(hydroxymethyl)-2-oxazoline were added to 3.5 grams of benzene and agitated to form a solution. The solution was heated to 75° F. and agitation continued until all of the oxazoline was dissolved. This solution was then added to 325 grams of an aqueous asphalt emulsion consisting essentially of about 62.3% asphalt and about 37.7% water while maintaining the emulsion at a temperature of about 145° F. The resulting mixture was agitated until a uniform emulsion was formed. 50 grams of a No. 12 stone aggregate was placed on a 16 ounce jar lid and completely covered by the addition thereto of 8 grams of the above-described uniform emulsion. The coated aggregate mix was then placed in an oven at a temperature of about 90° C. After 24 hours at this temperature, the coated aggregate mix was removed from the oven and placed in a 600 ml. beaker containing 400 ml. of boiling water, and stirred for 3 minutes at 60 r.p.m. The water was then poured off and the aggregate mix was placed on a piece of absorbent paper and allowed to stand until dry. It was then estimated that 98% of the total aggregate area remained covered.

The effectiveness of my asphalt composition additive is demonstrated by comparing the results shown in Example I with the results shown in Example II where no substituted oxazoline was added to the asphalt composition.

*Example II*

This test was conducted using the method described in Example I except that no substituted oxazoline was added to the asphalt and water emulsion. It was estimated that 40% of the total aggregate area remained covered at the completion of the test.

*Example III*

This test was conducted using the method described in Example I except that 2-heptadecenyl-4,4-bis(hydroxymethyl)-2-oxazoline was used instead of 2-heptadecyl-4,-4-bis(hydroxymethyl)-2-oxazoline. It was estimated that 98% of the total aggregate area remained covered after the test.

*Example IV*

This test was conducted using the method described in Example I except that 2-nonyl-4,4-bis(hydroxymethyl)-2-oxazoline was used instead of 2-heptadecyl-4,4-bis(hydroxymethyl)-2-oxazoline. It was estimated that 75% of the total aggregate area remained covered after the test.

*Example V*

This test was conducted using the method described in Example I except that 2-hendecyl-4,4-bis(hydroxymethyl)-2-oxazoline was used instead of 2-heptadecyl-4,4-bis(hydroxymethyl)-2-oxazoline. It was estimated that 87% of the total aggregate area remained covered after the test.

*Example VI*

This test was conducted using the method described in Example I except that 2-henicosyl-4,4-bis(hydroxymethyl-2-oxazoline was used instead of 2-heptadecyl-4,4-bis-(hydroxymethyl)-2-oxazoline. It was estimated that 87% of the total aggregate area remained covered after the test.

Now having described my invention, what I claim is:

1. Asphalt compositions consisting essentially of asphalt and from about 0.02 to about 5% by weight, based on the weight of the asphalt composition, of a substituted oxazoline having the general formula $$\begin{array}{c} HOH_2C \quad H \\ HOH_2C-C\!-\!-\!-\!C-H \\ | \quad\quad | \\ N \quad\ O \\ \diagdown\!\!\diagup \\ C \\ | \\ R \end{array}$$

in which R is selected from the group consisting of long chain alkyl and alkenyl hydrocarbon radicals containing not more than 30 carbon atoms and not less than about 9 carbon atoms.

2. The composition of claim 1 wherein the weight of the oxazoline ranges from about 0.5 to about 1.5% by weight.

3. The composition of claim 1 wherein the substituted oxazoline is 2-nonyl-4,4-bis(hydroxymethyl)-2-oxazoline.

4. The composition of claim 1 wherein the substituted oxazoline is 2-hendecyl-4,4-bis(hydroxymethyl)-2-oxazoline.

5. The composition of claim 1 wherein the substituted oxazoline is 2-heptadecenyl-4,4-bis(hydroxymethyl)-2-oxazoline.

6. The composition of claim 1 wherein the substituted oxazoline is 2-heptadecyl-4,4-bis(hydroxymethyl)-2-oxazoline.

7. The composition of claim 1 wherein the substituted oxazoline is 2-henicosyl-4,4-bis(hydroxymethyl)-2-oxazoline.

8. In a process for the preparation of an asphalt composition resistant to stripping from surfaces when applied thereto in aqueous emulsion form, the step which comprises incorporating in the aqueous asphalt emulsion from about 0.01 to about 3.5% by weight based on the weight of the asphalt composition of an oxazoline having the general formula $$\begin{array}{c} HOH_2C \quad H \\ HOH_2C-C\!-\!-\!-\!C-H \\ | \quad\quad | \\ N \quad\ O \\ \diagdown\!\!\diagup \\ C \\ | \\ R \end{array}$$

in which R is selected from the group consisting of long chain alkyl and alkenyl hydrocarbon radicals containing not more than 30 carbon atoms and not less than about 9 carbon atoms.

9. The process of claim 8 wherein the weight of the oxazoline ranges from about 0.3 to about 1.0% by weight.

10. In a process for the preparation of an asphalt composition resistant to stripping from surfaces when applied thereto in aqueous emulsion form, the step which comprises adding an amount of a solution containing 55–75% by weight based on the weight of the solution of an oxazoline having the general formula $$\begin{array}{c} HOH_2C \quad H \\ HOH_2C-C\!-\!-\!-\!C-H \\ | \quad\quad | \\ N \quad\ O \\ \diagdown\!\!\diagup \\ C \\ | \\ R \end{array}$$

in which R is selected from the group consisting of long chain alkyl and alkenyl hydrocarbon radicals containing not more than 30 carbon atoms and not less than about 9 carbon atoms to an asphalt composition to give an asphalt composition containing from about 0.1 to about 3.5% by weight of oxazoline based on the weight of the asphalt composition.

11. The process of claim 10 wherein the solution contains 60–70% by weight oxazoline to give an asphalt composition containing from about 0.3 to about 1.0% by weight oxazoline.

References Cited in the file of this patent

UNITED STATES PATENTS

| | | |
|---|---|---|
| 2,361,488 | Mikeska | Oct. 31, 1944 |
| 2,389,681 | Mikeska | Nov. 27, 1945 |
| 2,636,038 | Brandner | Apr. 21, 1953 |